(12) United States Patent
Zhidkov

(10) Patent No.: US 7,499,509 B2
(45) Date of Patent: Mar. 3, 2009

(54) RECEIVER FOR COMPENSATING NONLINEARLY DISTORTED MULTICARRIER SIGNALS

(75) Inventor: Sergey Zhidkov, Suwon-si (KR)

(73) Assignee: Samsung Electronics Co., Ltd., Suwon-SI (KR)

( * ) Notice: Subject to any disclaimer, the term of this patent is extended or adjusted under 35 U.S.C. 154(b) by 704 days.

(21) Appl. No.: 10/940,317

(22) Filed: Sep. 14, 2004

(65) Prior Publication Data

US 2005/0089125 A1    Apr. 28, 2005

(30) Foreign Application Priority Data

Oct. 28, 2003    (KR) .................. 10-2003-0075574

(51) Int. Cl.
*H03D 1/06* (2006.01)
(52) U.S. Cl. .................. 375/346; 375/134; 375/136; 375/146; 375/147; 375/142; 375/143; 375/148; 375/230; 375/232; 375/233; 375/234; 375/235; 375/243; 375/254; 375/262; 375/278; 375/284; 375/285; 375/296; 375/311; 375/326; 375/341; 375/345; 375/363
(58) Field of Classification Search .................. 375/134, 375/146–147, 142–143, 148, 230, 232–236, 375/243, 341, 254, 262, 278, 285, 296, 311, 375/326, 345–346, 363

See application file for complete search history.

(56) References Cited

U.S. PATENT DOCUMENTS

| | | | |
|---|---|---|---|
| 6,320,463 | B1 | 11/2001 | Leva et al. |
| 6,545,535 | B2 | 4/2003 | Andre |
| 6,907,092 | B1* | 6/2005 | Yakhnich et al. ............ 375/346 |
| 2002/0172297 | A1* | 11/2002 | Ouchi et al. ................ 375/316 |
| 2004/0021795 | A1* | 2/2004 | Kim .......................... 348/607 |
| 2004/0252229 | A1* | 12/2004 | Jiang et al. ............... 348/385.1 |
| 2005/0105656 | A1* | 5/2005 | Bateman et al. ............ 375/345 |
| 2006/0227859 | A1* | 10/2006 | Wei et al. .................... 375/233 |

FOREIGN PATENT DOCUMENTS

| | | |
|---|---|---|
| EP | 1 249 979 A2 | 10/2002 |
| EP | 1317107 A1 | 6/2003 |
| JP | 2001251274 | 9/2001 |

* cited by examiner

*Primary Examiner*—Shuwang Liu
*Assistant Examiner*—Kabir A Timory
(74) *Attorney, Agent, or Firm*—F. Chau & Associates, LLC

(57) ABSTRACT

An apparatus for compensating nonlinearly distorted multicarrier signals, a multicarrier signal receiver using the same, and a method therefor are provided, where the apparatus for compensating multicarrier signals and the multicarrier signal receiver using the apparatus extract parameter information on the HPA mode from the received signal so that nonlinear distortion of the received multicarrier signal is compensated for even though an accurate transfer function of a high power amplifier (HPA) is not known and side information or a special training signal is not transmitted when a signal is transmitted, such that nonlinearly distorted multicarrier signals such as OFDM signals transmitted by an HPA having a variety of transfer functions can be adaptively compensated and therefore a demodulated signal with an improved symbol error rate (SER) can be obtained.

24 Claims, 7 Drawing Sheets

RECEIVER FOR COMPENSATING NONLINEARLY DISTORTED MULTICARRIER SIGNALS

CROSS-REFERENCE TO RELATED APPLICATION

This application claims priority under 35 U.S.C. § 119 to Korean Patent Application No. 10-2003-0075574, filed Oct. 28, 2003, the contents of which are incorporated herein by reference in their entirety.

BACKGROUND OF THE INVENTION

1. Field of the Invention

The present invention relates to multicarrier signal receivers, and more particularly, to receivers for compensating nonlinearly distorted multicarrier signals.

2. Description of the Related Art

In wireless telecommunications as defined in IEEE 802.11 standard protocols, information is transmitted and received by using multicarrier signals such as orthogonal frequency division multiplexer (OFDM) signals. The wireless telecommunications using these OFDM signals include wireless local area network (LAN), European digital terrestrial video broadcasting (DVB-T), and the like.

FIG. 1 is a block diagram of an ordinary multicarrier signal transmission and reception system for wireless telecommunications. Referring to FIG. 1, a transmitter 1 of an ordinary multicarrier signal transmission and reception system for wireless telecommunications has a forward error correction (FEC) encoder 3, a mapping unit 4, a pilot insertion unit 5, an inverse fast Fourier transform (IFFT) unit 6, a guard interval (GI) insertion unit 7, a digital-to-analog (DA) conversion unit 8, and an up-converter 9. In addition, the transmitter 1 has a nonlinear high power amplifier (HPA) 10 which performs high power amplification for the output signal of the up-converter 9 and transmits to the air. The signal transmitted to the air is transmitted through a multipath channel 11 and is received by a receiver 2. The receiver 2 has a down-converter 12, an analog-to-digital (AD) conversion unit 13, a GI removal unit 14, a demodulation unit 15, which is formed with a fast Fourier transform (FFT) unit 16 and an equalizer 17, a demapping unit 18 and an FEC decoder 19.

However, in this multicarrier signal transmission and reception system, due to the use of the nonlinear HPA 10, in-band nonlinear distortion is caused such that the symbol error rate (SER) is degraded. In order to reduce this nonlinear distortion, such techniques as a back-off scheme, clipping, a peak-to-average power reduction scheme, a pre-distortion technique, and a special type of error correction, are being used. A drawback is that these techniques to reduce nonlinear distortion should also be implemented in the transmitter 1 to modify the conventional standard transmission protocol.

FIG. 2 shows a method for reducing nonlinear distortion, known as a decision-aided reconstruction (DAR) technique. The technique is described in an article by D. Kim, L. Stuber, "Clipping noise mitigation for OFDM by decision-aided reconstruction", IEEE Commun. Letters, Vol.3, No. 1, January 1999. Referring to FIG. 2, the DAR receiver for receiving a nonlinearly distorted multicarrier signal has an FFT unit 20, an equalizer 21, a decoder 22, an IFFT unit 23, an up-sampler 24, a nonlinear transfer function output unit 25, a down-sampler 26, and an FFT unit 27.

However, a drawback is that the DAR receiver in FIG. 2 should know the nonlinear transfer function g(.) in advance. In order to estimate the function g(.) when the nonlinear transfer function g(.) is not known, a method may be used in which, when a signal is transmitted, side information or a special training signal that is needed for reconstruction of g(.) is transmitted together. This method reduces throughput of the telecommunications system and at the same time should modify the existing standard transmission protocol. Accordingly, it is difficult to apply this method to a telecommunications system using a multicarrier signal, such as an OFDM signal.

SUMMARY OF THE INVENTION

An embodiment of the present disclosure provides an apparatus for compensating multicarrier signal distortion, which even when an accurate transfer function of a high power amplifier (HPA) is not known or side information or a special training signal is not transmitted in transmitting a signal, extracts a parameter for an HPA model from a received signal and compensates for nonlinear distortion of the received multicarrier signal, and a multicarrier signal receiver using the apparatus.

An embodiment of the present disclosure also provides a method compensating for multicarrier signal distortion, by which even when an accurate transfer function of an HPA is not known or side information or a special training signal is not transmitted in transmitting a signal, a parameter for an HPA model from a received signal is extracted and nonlinear distortion of the received multicarrier signal is compensated for, and a multicarrier signal demodulation method.

According to an aspect of the present disclosure, there is provided an apparatus compensating for multicarrier signal distortion, comprising a transmission parameter estimation unit, and a distortion compensation unit. The transmission parameter estimation unit operates by using error information, distortion information and channel state information in a predetermined algorithm, calculates and outputs amplifier parameter information. The distortion compensation unit operates by processing a first bitstream, generates an estimation symbol stream, and by using the first bitstream and the estimation symbol stream, calculates and outputs the error information and the distortion information, and subtracts a compensation signal, which is calculated by using the distortion information and the amplifier parameter information, from the first bitstream, and outputs the subtraction result as an output bitstream.

According to another aspect of the present disclosure, there is provided an apparatus compensating for multicarrier signal distortion, comprising a mode selection unit, a transmission parameter estimation unit, and a distortion compensation unit. The mode selection unit operates in response to a logic state of a mode signal, selects an input bitstream or an output bitstream, and outputs as a first bitstream. The transmission parameter estimation unit operates by using error information, distortion information and channel state information in a predetermined algorithm only when the mode selection unit outputs the input bitstream as the first bitstream, and calculates and outputs amplifier parameter information. The distortion compensation unit operates by processing the first bitstream, generates an estimation symbol stream, and by using the first bitstream and the estimation symbol stream, calculates and outputs the error information and the distortion information, and subtracts a compensation signal, which is calculated by using the distortion information and the amplifier parameter information, from the first bitstream, and outputs the subtraction result as an output bitstream, wherein the output bitstream is fed back to the mode selection unit such that the output bitstream is re-compensated in the distortion compensation unit at least once or more.

The distortion compensation unit comprises a demapping and pilot insertion unit, a first subtraction unit, a signal distortion calculating unit, a compensation signal outputting unit and a second subtraction unit. The demapping and pilot insertion unit demaps the first bitstream, inserts a pilot, and outputs the estimation symbol stream. The first subtraction unit subtracts the estimation symbol stream from the first bitstream and outputs the error information. The signal distortion calculating unit operates by using the estimation symbol stream, calculates and outputs the distortion information. The compensation signal outputting unit operates by using the distortion information and the amplifier parameter information, calculates and outputs the compensation signal. The second subtraction unit subtracts the compensation signal from the first bitstream and outputs the output bitstream.

The signal distortion calculating unit comprises a plurality of distortion signal generators, each of which generates one of a plurality of distortion signals forming the distortion information, and each of the distortion signal generators comprises a multiplier which multiplies the estimation symbol stream by corresponding a predetermined constant and outputs the result; a convolution calculation unit which calculates and outputs a predetermined convolution value for the estimation symbol stream; and a subtracter which subtracts the output signal of the multiplier from the predetermined convolution value and outputs a distortion signal.

The signal distortion calculating unit comprises a first distortion signal generator and a second distortion signal generator which output a first distortion signal and a second distortion signal, respectively, the signals forming the distortion information.

The first distortion signal generator comprises: a first multiplier which multiplies a first predetermined constant by the estimation symbol stream and outputs the result; a first zero addition unit which adds first zeros to the estimation symbol stream and outputs the result; a first fast Fourier transform (FFT) unit which performs first FFT transform for point values formed with the estimation symbol stream and the first zeros and outputs the result; a first square calculation unit which calculates the square of the first FFT transformed value and outputs the result as a first square value; a first sequence change unit which reverses the sequence of the point values of the estimation symbol stream and outputs the result; a second FFT unit which performs second FFT transform for point values formed with the sequence-reversed estimation symbol stream and the first zeros and outputs the result; a second multiplier which multiplies the first square value by the output value of the second FFT unit and outputs the result; a first inverse fast Fourier transform (IFFT) unit which performs IFFT transform for the output value of the second multiplier and outputs a first convolution value; a first out-of-band component removal unit which removes the out-of-band component from the first convolution value and outputs the result; and a first subtraction unit which subtracts the output value of the first multiplier from the output value of the out-of-band component removal unit and outputs the result as the first distortion signal.

The second distortion signal generator comprises: a third multiplier which multiplies the estimation symbol stream by a second predetermined constant and outputs the result; a second zero addition unit which adds second zeros to the estimation symbol stream and outputs the result; a third FFT unit which performs third FFT transform for point values formed with the estimation symbol stream and the second zeros; a cube calculation unit which calculates and outputs the cube of the third FFT transformed value; a second sequence change unit which reverse the sequence of the point values of the estimation symbol stream and outputs the result; a fourth FFT unit which performs fourth FFT transform for point values formed with the sequence-reversed estimation symbol stream and the second zeros; a second square unit which calculates the square value of the fourth FFT transformed value and outputs the result as a second square value; a fourth multiplier which multiplies the output value of the cube calculation unit by the second square value and outputs the result; a second IFFT unit which performs IFFT transform for the output of the fourth multiplier and outputs a second convolution value; a second out-of-band component removal unit which removes the out-of-band component from the second convolution value and outputs the result; and a second subtraction unit which subtracts the output value of the third multiplier from the output value of the second out-of-band component removal unit and outputs the result as the second distortion signal.

If the distortion signal generators are formed with a first distortion signal generator and a second signal generator, the amplifier parameter information is calculated by the following equations:

$$E = \left[ R_0^{(eq)} - \hat{S}_0 R_1^{(eq)} - \hat{S}_1 \ldots R_{N-1}^{(eq)} - \hat{S}_{N-1} \right]^T$$

$$D = \begin{bmatrix} \hat{d}_0^{(3)} - P^{(3)}\hat{S}_0 & \hat{d}_0^{(5)} - P^{(5)}\hat{S}_0 \\ \hat{d}_1^{(3)} - P^{(3)}\hat{S}_1 & \hat{d}_1^{(5)} - P^{(5)}\hat{S}_2 \\ \ldots & \ldots \\ \hat{d}_{N-1}^{(3)} - P^{(3)}\hat{S}_{N-1} & \hat{d}_{N-1}^{(5)} - P^{(5)}\hat{S}_{N-1} \end{bmatrix}$$

$$\hat{c} = (D^T D)^{-1} D^T E$$

where E denotes error information, D denotes distortion information, $\hat{c}$ denotes amplifier parameter information, $R^{(eq)}$ denotes a first bitstream, $\hat{S}$ denotes an estimation symbol stream, $d^{(3)}$ denotes a convolution value used in first distortion signal calculation, $d^{(5)}$ denotes a convolution value used in second distortion signal calculation, $P^{(3)}$ denotes a predetermined constant used in the first distortion signal calculation, $P^{(5)}$ denotes a predetermined constant used in the second distortion signal calculation, and subscripts 0, 1, . . . , N−1 correspond to subcarrier indexes, wherein when the channel state information of a certain subcarrier is less than a predetermined critical value, values corresponding to the subcarrier are excluded from these equations.

The convolution values of the first and second distortion signal generators are obtained by the following equations respectively:

$$\{\hat{d}_k^{(3)}\} = \{\hat{S}_k\} * \{\hat{S}_k\} * \{\hat{S}_{N-k}^+\} =$$

$$IFFT([FFT\{[\hat{S}_0 \ldots \hat{S}_{N-1} \ldots 0 \ldots 0]\}]^{\cap 2} \circ FFT \{[\hat{S}_{N-1} \ldots \hat{S}_0 \ldots 0 \ldots 0]\}), k=-N, \ldots, 2N-1$$

$$\{\hat{d}_k^{(5)}\} = \{\hat{S}_k\} * \{\hat{S}_k\} * \{\hat{S}_k\} * \{\hat{S}_{N-k}^+\} * \{\hat{S}_{N-k}^+\} =$$

$$IFFT([FFT\{[\hat{S}_0 \ldots \hat{S}_{N-1} \ldots 0 \ldots 0]\}]^{\cap 3} \circ [FFT \{[\hat{S}_{N-1} \ldots \hat{S}_0 \ldots 0 \ldots 0]\}]^{\cap 2}), k=-2N, \ldots, 3N-1$$

where $d^{(3)}$ denotes a convolution value used in first distortion signal calculation, $d^{(5)}$ denotes a convolution value used in second distortion signal calculation, and $\hat{S}$ denotes an estimation symbol stream.

According to still another aspect of the present disclosure, there is provided a multicarrier signal receiver comprising an FFT unit, an equalizer, and a distortion compensation apparatus. The FFT unit performs FFT transform for an input bitstream and outputs the result. The equalizer performs first distortion compensation for the output signal of the FFT unit and outputs a first bitstream and channel state information. The distortion compensation unit by processing the first bitstream, generates an estimation symbol stream, and by using error information and distortion information, which are calculated by using the first bitstream and the estimation symbol stream, and the channel state information in a predetermined algorithm, estimates amplifier parameter information, and subtracts a compensation signal, which is calculated by using the distortion information and the amplifier parameter information, from the first bitstream, and outputs the subtraction result as an output bitstream.

According to yet still another aspect of the present disclosure, there is provided a multicarrier signal receiver comprising an FFT unit, an equalizer, a mode selection unit and a distortion compensation apparatus. The FFT unit performs FFT transform for an input bitstream and outputs the result. The equalizer performs first distortion compensation for the output signal of the FFT unit and outputs a first bitstream and channel state information. The mode selection unit in response to a logic state of a mode signal, selects the first compensation bitstream or the output bitstream and outputs as a first bitstream. The distortion compensation unit by processing a first bitstream, generates an estimation symbol stream, and by using error information and distortion information, which are calculated by using the first bitstream and the estimation symbol stream, and the channel state information in a predetermined algorithm, estimates amplifier parameter information, and subtracts a compensation signal, which is calculated by using the distortion information and the amplifier parameter information, from the first bitstream, and outputs the subtraction result as an output bitstream. Here, only when the mode selection unit outputs the first compensation bitstream as the first bitstream, the distortion compensation apparatus updates the amplifier parameter information and the output bitstream is fed back to the mode selection unit so that the output bitstream is re-compensated in the distortion compensation apparatus at least once or more.

According to a further aspect of the present disclosure, there is provided a method compensating for multicarrier signal distortion comprising: by processing a first bitstream, generating an estimation symbol stream; by using the first bitstream and the estimation symbol stream, calculating and outputting error information and distortion information; by using the error information, the distortion information and channel state information in a predetermined algorithm, calculating and outputting amplifier parameter information; and subtracting a compensation signal, which is calculated by using the distortion information and the amplifier parameter information, from the first bitstream, and outputting the subtraction result as an output bitstream.

According to an additional aspect of the present disclosure, there is provided a method compensating for multicarrier signal distortion comprising: in response to a logic state of a mode signal, selecting an input bitstream or an output bitstream, and outputting as a first bitstream; by processing a first bitstream, generating an estimation symbol stream; by using the first bitstream and the estimation symbol stream, calculating and outputting error information and distortion information; by using the error information, the distortion information and channel state information in a predetermined algorithm only when the input bitstream is output as the first bitstream, calculating and outputting amplifier parameter information; and subtracting a compensation signal, which is calculated by using the distortion information and the amplifier parameter information, from the first bitstream, and outputting the subtraction result as an output bitstream, wherein the output bitstream is fed back as the first bitstream such that the output bitstream is re-compensated in the distortion compensation unit at least once or more.

According to an additional aspect of the present disclosure, there is provided a multicarrier signal demodulation method comprising: performing FFT transform for an input bitstream and outputting the result; performing first distortion compensation for the FFT transformed result and outputting a first bitstream and channel state information; by processing the first bitstream, generating an estimation symbol stream; by using the first bitstream and the estimation symbol stream, calculating and outputting error information and distortion information; by using the error information, the distortion information and the channel state information in a predetermined algorithm, calculating and outputting amplifier parameter information; and subtracting a compensation signal, which is calculated by using the distortion information and the amplifier parameter information, from the first bitstream, and outputting the subtraction result as an output bitstream.

According to an additional aspect of the present disclosure, there is provided a multicarrier signal demodulation method comprising: performing FFT transform for an input bitstream and outputting the result; performing first distortion compensation for the FFT transformed result and outputting a first bitstream and channel state information; in response to a logic state of a mode signal, selecting the first compensation bitstream or the output bitstream and outputting as a first bitstream; by processing the first bitstream, generating an estimation symbol stream; by using the first bitstream and the estimation symbol stream, calculating and outputting error information and distortion information; by using the error information, the distortion information and the channel state information in a predetermined algorithm, calculating and outputting amplifier parameter information; and subtracting a compensation signal, which is calculated by using the distortion information and the amplifier parameter information, from the first bitstream, and outputting the subtraction result as an output bitstream, wherein only when the first compensation bitstream is output as the first bitstream, the amplifier parameter information is updated and the output bitstream is fed back as the first bitstream so that the output bitstream is re-compensated at least once or more.

BRIEF DESCRIPTION OF THE DRAWINGS

The above objects and advantages of the present disclosure will become more apparent by describing in detail preferred embodiments thereof with reference to the attached drawings in which.

DETAILED DESCRIPTION OF PREFERRED EMBODIMENTS

Figure 1:
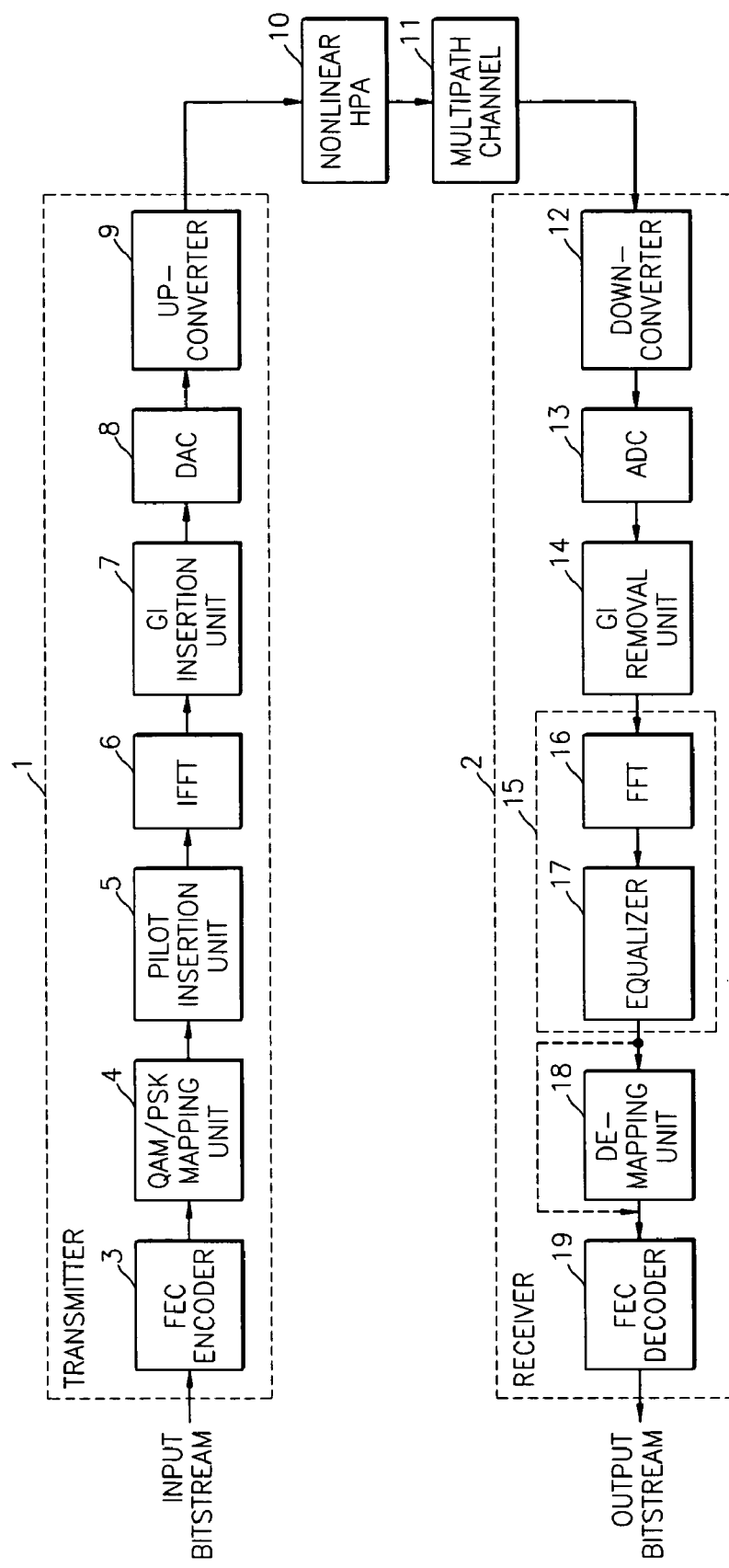
FIG. 1 is a block diagram of an ordinary multicarrier signal transmission and reception system for wireless telecommunications.
Figure 2:
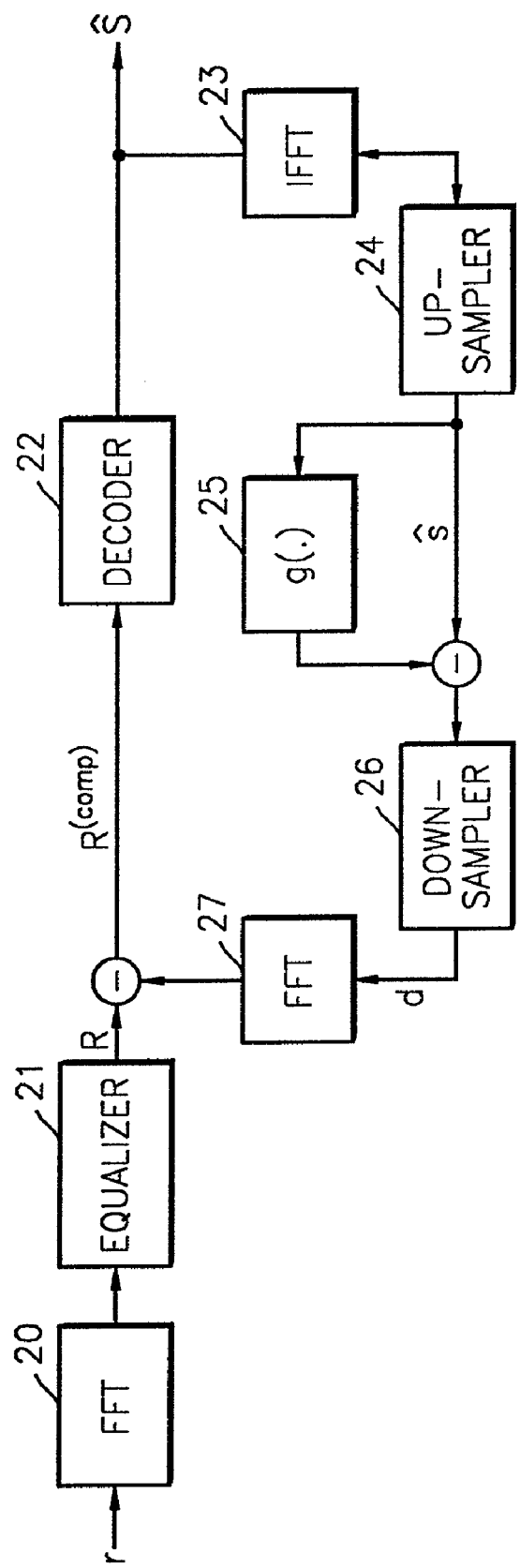
FIG. 2 is a block diagram of the prior art receiver receiving nonlinearly distorted multicarrier signals.
Figure 3:
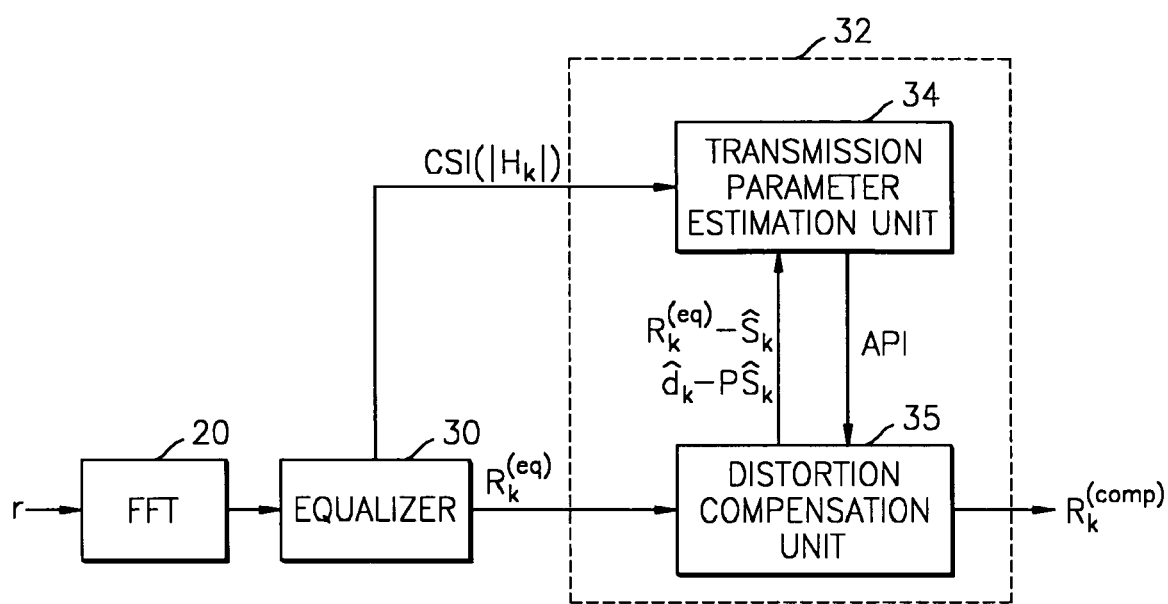
FIG. 3 is a block diagram of a multicarrier signal receiver according to a preferred embodiment of the present disclosure.

Referring to FIG. 3, a multicarrier signal receiver according to a preferred embodiment of the present disclosure has an FFT unit 29, an equalizer 30, and a distortion compensation apparatus 32.

The FFT unit 29 performs FFT transform for an input bitstream (r) and outputs. The equalizer 30 perform 1st distortion compensation for the output signal of the FFT unit 29 and outputs a first bitstream ($R_k^{(eq)}$) and channel state information (CSI). The CSI is information indicating the signal to noise ratio (SNR) of a received sub-carrier, such as the magnitude information of channel frequency response ($|H_k|$).

The distortion compensation apparatus 32 processes the first bitstream ($R_k^{(eq)}$), and generates an estimation symbol stream ($\hat{S}_k$). By using error information ($R_k^{(eq)}-\hat{S}_k$) and distortion information ($\hat{d}_k-P\hat{S}_k$), which are calculated by using the first bitstream ($R_k^{(eq)}$) and the estimation symbol stream ($\hat{S}_k$), and the CSI in a predetermined algorithm, that is, a least mean square algorithm, amplifier parameter information (API) is estimated. Then, a compensation signal ($\hat{Q}_k$), which is calculated by using the distortion information ($\hat{d}_k-P\hat{S}_k$) and the amplifier parameter information (API), is subtracted from the first bitstream ($R_k^{(eq)}$), and the subtraction result is output as an output bitstream ($R_k^{(comp)}$).

Figure 4:
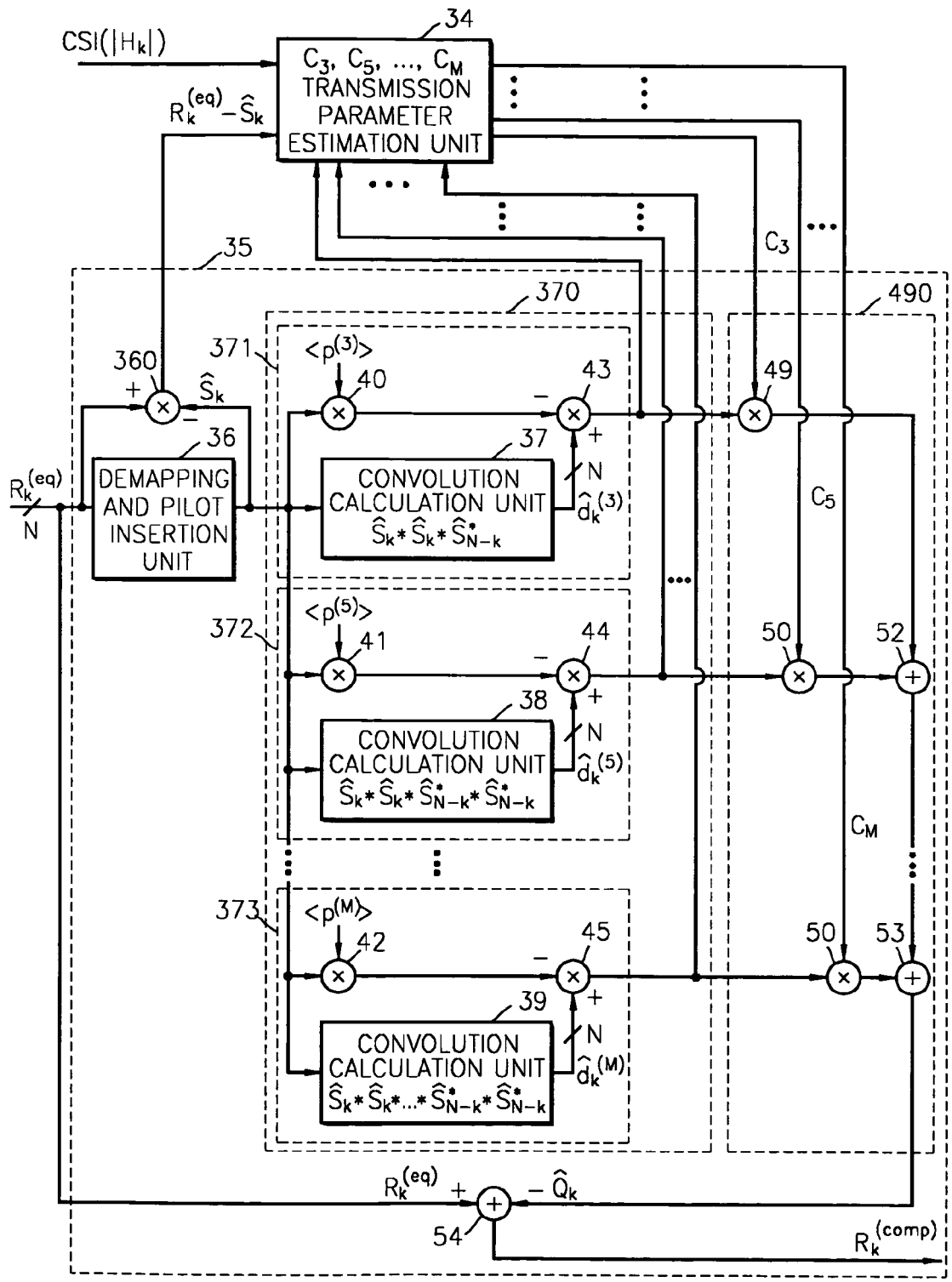
FIG. 4 is a detailed block diagram of an apparatus compensating for multicarrier signal distortion according to a preferred embodiment of the present disclosure.

FIG. 4 is a detailed block diagram of the apparatus 32 compensating for multicarrier signal distortion according to a preferred embodiment of the present disclosure.

Referring to FIG. 4, the apparatus 32 compensating for multicarrier signal distortion according to a preferred embodiment of the present disclosure has a transmission parameter estimation unit 34 and a distortion compensation unit 35.

By using the error information ($R_k^{(eq)}-\hat{S}_k$), the distortion information ($\hat{d}_k-P\hat{S}_k$) and the CSI in a least mean square algorithm, the transmission parameter estimation unit 34 calculates and outputs amplifier parameter information (API). The amplifier parameter information (API) corresponds to $C_3, C_5, \ldots C_M$ in FIG. 4.

The distortion compensation unit 35 generates an estimation symbol stream ($\hat{S}_k$) by processing the first bitstream ($R_k^{(eq)}$), calculates and outputs the error information ($R_k^{(eq)}-\hat{S}_k$) and the distortion information ($\hat{d}_k-P\hat{S}_k$) by using the first bitstream ($R_k^{(eq)}$) and the estimation symbol stream ($\hat{S}_k$), subtracts a compensation signal ($\hat{Q}_k$), which is calculated by using the distortion information ($\hat{d}_k-P\hat{S}_k$) and the amplifier parameter information (API), from the first bitstream ($R_k^{(eq)}$), and outputs the subtraction result as an output bitstream ($R_k^{(comp)}$).

The distortion compensation unit 35 has a demapping and pilot insertion unit 36, a first subtraction unit 360, a signal distortion calculating unit 370, a compensation signal outputting unit 490, and a second subtraction unit 54.

The demapping and pilot insertion unit 36 demaps the first bit stream ($R_k^{(eq)}$), inserts a pilot, and outputs the estimation symbol stream ($\hat{S}_k$). The first subtraction unit 360 subtracts the estimation symbol stream ($\hat{S}_k$) from the first bitstream ($R_k^{(eq)}$) and outputs the error information ($R_k^{(eq)}-\hat{S}_k$). The signal distortion calculating unit 370 calculates and outputs the distortion information ($\hat{d}_k-P\hat{S}_k$) by using the estimation symbol stream ($\hat{S}_k$). The compensation signal outputting unit 490 calculates and outputs the compensation signal ($\hat{Q}_k$) by using the distortion information ($\hat{d}_k-P\hat{S}_k$) and the amplifier parameter information (API). The second subtraction unit 54 subtracts the compensation signal ($\hat{Q}_k$) from the first bitstream ($R_k^{(eq)}$) and outputs the output bitstream ($R_k^{(comp)}$).

The signal distortion calculating unit 370 has distortion signal generators 371 through 373 that output a plurality of distortion signals forming the distortion information ($\hat{d}_k-P\hat{S}_k$). Each of the distortion signal generators 371 through 373 has a multiplier 40, 41 or 42, a convolution calculation unit 37, 38 or 39, and a subtracter 43, 44 or 45. The multiplier 40, 41 or 42 multiplies the estimation symbol stream ($\hat{S}_k$) by a corresponding a predetermined constant ($P^{(*)}$) and outputs the result. The convolution calculation unit 37, 38 or 39 calculates and outputs a predetermined convolution value ($\hat{d}_k$) for the estimation symbol stream ($\hat{S}_k$). The subtracter 43, 44 or 45 subtracts the output signal of the multiplier 40, 41 or 42 from the predetermined convolution value ($\hat{d}_k$) and outputs a distortion signal.

Meanwhile, when a symbol stream transmitted by the transmission side is expressed as $\hat{S}_k$, a signal, which is non-linearly distorted by the HPA and received by the multicarrier signal receiver, can be expressed as in the following equation 1. Parameters used in the equation 1 can be expressed as in the following equation 2, and convolution values $d_k^{(3)}$ and $d_k^{(5)}$ can be expressed as in the following equation 3. In the equation 2, b denotes a coefficient related to original parameters of the HPA, and $P^{(3)}$ and $P^{(5)}$ denote predetermined constants determined according to the signal constellation type.

$$S'_k = \alpha S_k + d_k, k=0,1,\ldots,N-1 \tag{1}$$

$$\alpha \approx b_1 + \frac{3}{4}b_3 P^{(3)} + \frac{5}{8}b_5 P^{(5)} \tag{2}$$

$$d_k = \frac{3}{4}b_3[d_k^{(3)} - P^{(3)}S_k] + \frac{5}{8}b_5[d_k^{(5)} - P^{(5)}S_k]$$

$$\{d_k^{(3)}\} = \{S_k\}*\{S_k\}*\{S_{N-k}^+\}$$

$$\{d_k^{(5)}\} = \{S_k\}*\{S_k\}*\{S_k\}*\{S_{N-k}^+\}*\{S_{N-k}^+\} \tag{3}$$

Here, the first bitstream ($R_k^{(eq)}$) output from the equalizer 30 can be expressed as in the following equation 4. In the equation 4, $H_k$ denotes a channel frequency response, a denotes attenuation factor, $n_k$ denotes white Gaussian noise, and $C_3$ and $C_5$ denote original parameters related to the HPA and can be expressed as in the following equation 5. As shown in the equation 4, the first bitstream ($R_k^{(eq)}$) contains a nonlinear distortion component and noise component caused by the HPA. This approximation of the first bitstream ($R_k^{(eq)}$) as the equation 4 can be inferred from the general communications theories and an article for interpreting a model for a transmission signal nonlinearly distorted by an HPA by J. F. Sevic, M.

B. Steer, A. M. Pavio, "Nonlinear analysis methods for the simulation of digital wireless communication systems", Int. J. microwave millimeter-wave computer-aided eng., vol. 6, no. 2, pp.197-216, 1996, is referred to in particular:

$$R_k^{(eq)} \approx S_k + c_3[d_k^{(3)} - P^{(3)}S_k] + c_5[d_k^{(5)} - P^{(5)}S_k] + (H_k\alpha)^{-1}n_k$$
$$k=0,1,\ldots,-1 \tag{4}$$

$$c_3 = \frac{\frac{3}{4}b_3}{b_1 + \frac{3}{4}b_3 P^{(3)} + \frac{5}{8}b_5 P^{(5)}} \tag{5}$$

$$c_5 = \frac{\frac{5}{8}b_5}{b_1 + \frac{3}{4}b_3 P^{(3)} + \frac{5}{8}b_5 P^{(5)}}$$

When each of the distortion signal genitors 371 through 373 is formed with a first distortion signal generator 561 and a second distortion signal generator 562, the amplifier parameter information (API) corresponding to $C_3$ and $C_5$ shown in the equation 5 can be obtained from the following equation 7 by using the following equation 6. This is known as the least mean square algorithm. However, an algorithm used for calculating the amplifier parameter information (API) is not limited to the least mean square algorithm, and other steepest decent algorithms can be used instead. Here, E denotes error information, D denotes distortion information, ĉ denotes amplifier parameter information (API), $R^{(eq)}$ denotes a first bitstream, Ŝ denotes an estimation symbol stream, $d^{(3)}$ denotes a convolution value used in first distortion signal calculation, $d^{(5)}$ denotes a convolution value used in second distortion signal calculation, $p^{(3)}$ denotes a predetermined constant used in the first distortion signal calculation, and $p^{(5)}$ denotes a predetermined constant used in the second distortion signal calculation. Predetermined constants such as $p^{(3)}$ and $p^{(5)}$ are determined according to the signal constellation type, for example, binary phase shift keying (BPSK), quadrature phase shift keying (QPSK), 8-PSK, 16-quadrature amplitude modulation (QAM), 64-QAM, and 256-QAM. The constants such as $p^{(3)}$ and $p^{(5)}$ are calculated or appropriately selected through experiments. In addition, subscripts 0, 1, ..., N−1 correspond to subcarrier indexes (k):

$$E = \left[ R_0^{(eq)} - \hat{S}_0 R_1^{(eq)} - \hat{S}_1 \ldots R_{N-1}^{(eq)} - \hat{S}_{N-1} \right]^T \tag{6}$$

$$D = \begin{bmatrix} \hat{d}_0^{(3)} - P^{(3)}\hat{S}_0 & \hat{d}_0^{(5)} - P^{(5)}\hat{S}_0 \\ \hat{d}_1^{(3)} - P^{(3)}\hat{S}_1 & \hat{d}_1^{(5)} - P^{(5)}\hat{S}_2 \\ \ldots & \ldots \\ \hat{d}_{N-1}^{(3)} - P^{(3)}\hat{S}_{N-1} & \hat{d}_{N-1}^{(5)} - P^{(5)}\hat{S}_{N-1} \end{bmatrix}$$

$$\hat{c} = (D^T D)^{-1} D^T E \tag{7}$$

The amplifier parameter information (API) is calculated using channel state information (CSI) of each of the subcarriers included in one OFDM symbol, and the equation 6 is applied to each OFDM symbol. That is, when the channel state information (CSI) of each subcarrier included in one OFDM symbol is more than a predetermined critical value, the equation 6 is used. However, if the channel state information (CSI) of a certain subcarrier is less than the predetermined critical value, values corresponding to the subcarrier are excluded from the equation 6. For example, when the subcarrier index (k) is 0, if the corresponding channel state information (CSI) is less than the predetermined critical value, the following equation 8 is used in place of the equation 6.

$$E = \left[ R_1^{(eq)} - \hat{S}_1 R_2^{(eq)} - \hat{S}_2 \ldots R_{N-1}^{(eq)} - \hat{S}_{N-1} \right]^T \tag{8}$$

$$D = \begin{bmatrix} \hat{d}_1^{(3)} - P^{(3)}\hat{S}_1 & \hat{d}_1^{(5)} - P^{(5)}\hat{S}_1 \\ \hat{d}_2^{(3)} - P^{(3)}\hat{S}_2 & \hat{d}_2^{(5)} - P^{(5)}\hat{S}_2 \\ \ldots & \ldots \\ \hat{d}_{N-1}^{(3)} - P^{(3)}\hat{S}_{N-1} & \hat{d}_{N-1}^{(5)} - P^{(5)}\hat{S}_{N-1} \end{bmatrix}$$

The first convolution value ($\hat{d}_k^{(3)}$) in the first distortion signal generator and the second convolution value ($\hat{d}_k^{(5)}$) in the second distortion signal generator can be expressed as the following equations 9 and 10, respectively. Here, $d^{(3)}$ denotes a convolution value used in first distortion signal calculation, $d^{(5)}$ denotes a convolution value used in second distortion signal calculation, and Ŝ denotes an estimation symbol stream. In addition, symbol "⊙" denotes element-by-element multiplication of two vectors, and symbol "∘" denotes element-by-element power:

$$\{\hat{d}_k^{(3)}\} = \{\hat{S}_k\} * \{\hat{S}_k\} * \{\hat{S}_{N-k}^*\} =$$
$$IFFT([FFT\{[\hat{S}_0 \ldots \hat{S}_{N-1} \ldots 0 \ldots 0]\}]^{\cap 2} \circ FFT\{[\hat{S}_{N-1} \ldots \hat{S}_0 \ldots 0 \ldots]\}), k=-N, \ldots, 2N-1 \tag{9}$$

$$\{\hat{d}_k^{(5)}\} = \{\hat{S}_k\} * \{\hat{S}_k\} * \{\hat{S}_k\} * \{\hat{S}_{N-k}^*\} * \{\hat{S}_{N-k}^*\} =$$
$$= IFFT([FFT\{[\hat{S}_0 \ldots \hat{S}_{N-1} \ldots 0 \ldots 0]\}]^{\cap 3} \circ [FFT\{[\hat{S}_{N-1} \ldots \hat{S}_0 \ldots 0 \ldots 0]\}]^{\cap 2}), k=-2N, \ldots, 3N-1 \tag{10}$$

Figure 5:
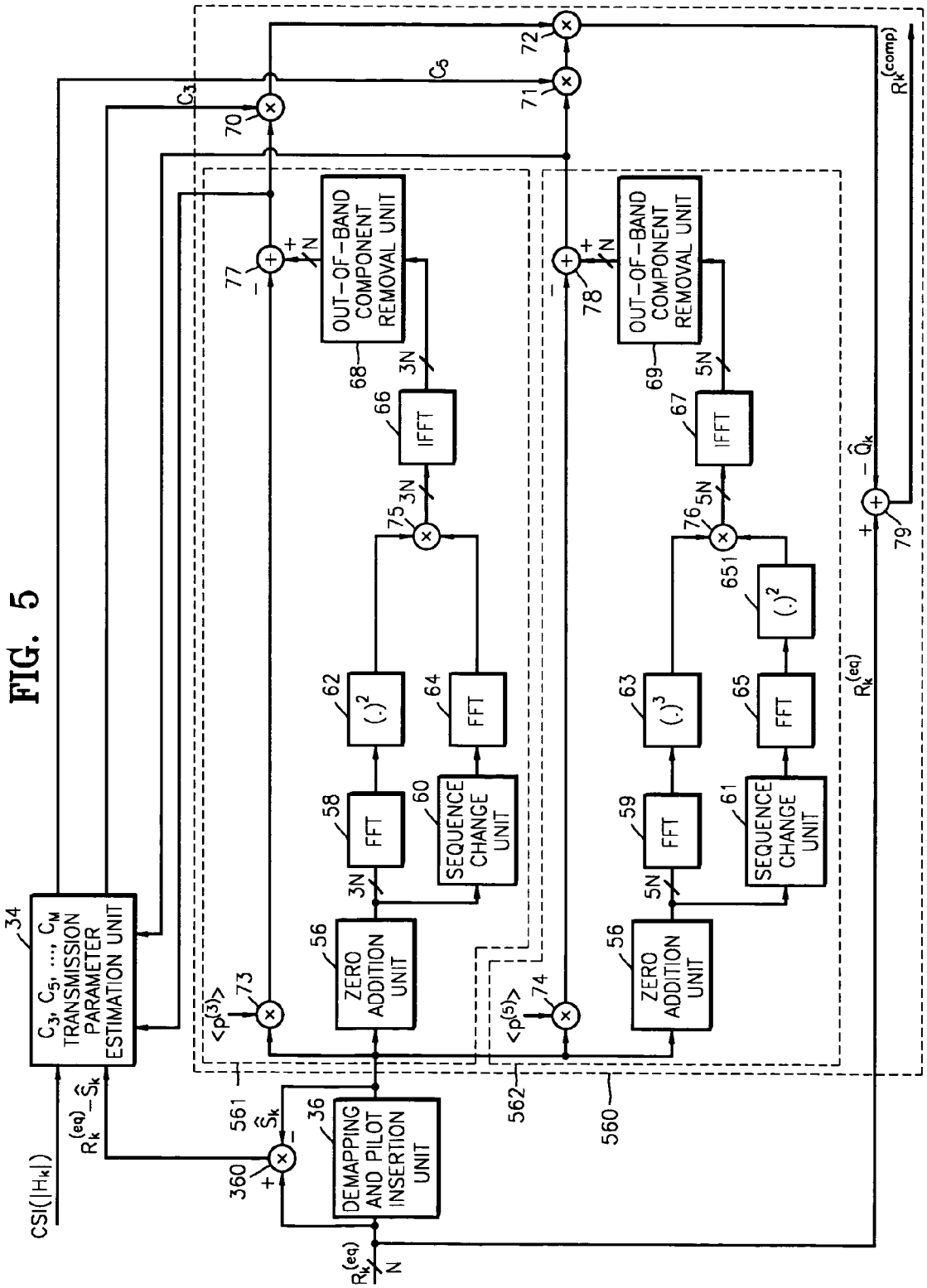
FIG. 5 is a detailed block diagram of an apparatus compensating for multicarrier signal distortion according to another preferred embodiment of the present disclosure.

FIG. 5 is a detailed block diagram of an apparatus 32 compensating for multicarrier signal distortion according to another preferred embodiment of the present disclosure, which is to calculate the first convolution value ($\hat{d}_k^{(3)}$) in the first distortion signal generator 561 and the second convolution value ($\hat{d}_k^{(5)}$) in the second distortion signal generator 562 as shown in the equations 9 and 10, respectively.

The structure and operation of the apparatus shown in FIG. 5 are the same as those of the apparatus shown in FIG. 4, except a signal distortion calculating unit 560. That is, the signal distortion calculating unit 370 of FIG. 4 can be replaced by the signal distortion unit 560 of FIG. 5. Referring to FIG. 5, the signal distortion calculating unit 560 has a first distortion signal generator 561 and a second distortion signal generator 562 that output a first distortion signal ($d_k^{(3)}$-$P^{(3)}S_k$) and a second distortion signal ($d_k^{(5)}$-$P^{(3)}S_k$), the distortion signals forming distortion information ($\hat{d}_k$-$P\hat{S}_k$).

The first distortion signal generator 561 has a first multiplier 73, a first zero addition unit 56, a first FFT unit 58, a first square calculation unit 62, a first sequence change unit 60, a second FFT unit 64, a second multiplier 75, a first IFFT unit 65, a first out-of-band component removal unit 68, and a first subtraction unit 77. The first multiplier 73 multiplies a first predetermined constant by the estimation symbol stream and outputs the result. The first zero addition unit 56 adds first zeros to the estimation symbol stream and outputs the result. The first FFT unit 58 performs first FFT transform for the estimation symbol stream ($\hat{S}_k$) and point values formed with the first zeros, and outputs the result. The first square calculation unit 62 calculates the square of the first FFT transformed value and outputs as a first square value. The first sequence change unit 60 reverses the sequence of the point values of the estimation symbol stream ($\hat{S}_k$) and outputs the result. The second FFT unit 64 performs second FFT transform for the sequence-reversed estimation symbol stream ($\hat{S}_k$) and the point values formed with the first zeros, and outputs the result. The second multiplier 75 multiplies the first square value by the output value of the second FFT unit 64 and outputs the result. The first IFFT unit 65 performs IFFT transform for the output value of the second multiplier 75 and outputs a first convolution value ($\hat{d}_k^{(3)}$). The first out-of-band component removal unit 68 removes an out-of-band component from the first convolution value ($\hat{d}_k^{(3)}$) and outputs the result. The first subtraction unit 77 subtracts the output value of the first multiplier 73 from the output value of the out-of-band component removal unit 68, and outputs as a first distortion signal ($d_k^{(3)}-P^{(3)}S_k$).

Meanwhile, the second distortion signal generator 562 has a third multiplier 74, a second zero addition unit 57, a third FFT unit 59, a cube calculation unit 63, a second sequence change unit 61, a fourth FFT unit 65, a second square calculation unit 651, a fourth multiplier 76, a second IFFT unit 67, a second out-of-band component removal unit 69, and a second subtraction unit 78.

The third multiplier 74 multiplies the estimation symbol stream ($\hat{S}_k$) by a second predetermined constant ($P^{(5)}$) and outputs the result. The second zero addition unit 57 adds second zeros to the estimation symbol stream ($\hat{S}_k$) and outputs the result. The third FFT unit 59 performs third FFT transform for the estimation symbol stream ($\hat{S}_k$) and point values formed with the second zeros and outputs the result. The cube calculation unit 63 calculates the cube of the third FFT transformed value and outputs the result. The second sequence change unit 61 reverses the point values of the estimation symbol stream ($\hat{S}_k$) and outputs the result. The fourth FFT unit 65 performs fourth FFT transform for the sequence-reversed estimation symbol stream ($\hat{S}_k$) and the point values formed with the second zeros and outputs the result. The second square calculation unit 651 calculates the square of the fourth FFT transformed value and outputs as a second square value. The fourth multiplier 76 multiplies the output value of the cube calculation unit by the second square value and outputs the result. The second IFFT unit 67 performs IFFT transform for the output value of the fourth multiplier 76 and outputs a second convolution value ($\hat{d}_k^{(5)}$). The second out-of-band component removal unit 69 removes an out-of-band component from the second convolution value ($\hat{d}_k^{(5)}$) and outputs the result. The second subtraction unit 78 subtracts the output value of the third multiplier 74 from the output value of the second out-of-band component removal unit 69 and outputs as a second distortion signal ($d_k^{(5)}-P^{(5)}S_k$).

Accordingly, the compensation signal ($\hat{Q}_k$) output from the distortion compensation unit 35 is the same as equation 11. Therefore, being compensated by the compensation signal ($\hat{Q}_k$), the first bitstream ($R_k^{(eq)}$) which is input as the equation 4 is output as an output bitstream ($R_k^{(comp)}$) as equation 12. As shown in the equation 12, the output bitstream ($R_k^{(comp)}$) is a signal in which a distorted component by the HPA is removed and there is only a little noise component. The output bitstream ($R_k^{(comp)}$) is error corrected and decoded in a subsequent end, and then is sent through a predetermined video signal processing end and output to a display apparatus:

$$\hat{Q}_k = c_3[\hat{d}_k^{(3)}-P^{(3)}\hat{S}_k] + c_5[\hat{d}_k^{(5)}-P^{(5)}\hat{S}_k] \quad (11)$$

$$R_k^{(comp)} = R_k^{(eq)} - (\hat{c}_3[\hat{d}_k^{(3)}-P^{(3)}\hat{S}_k] + \hat{c}_5 [\hat{d}_k^{(5)}-P^{(5)}\hat{S}_k]) \approx S_k + (H_k\alpha)^{-1}n_k \quad (12)$$

Figure 6:
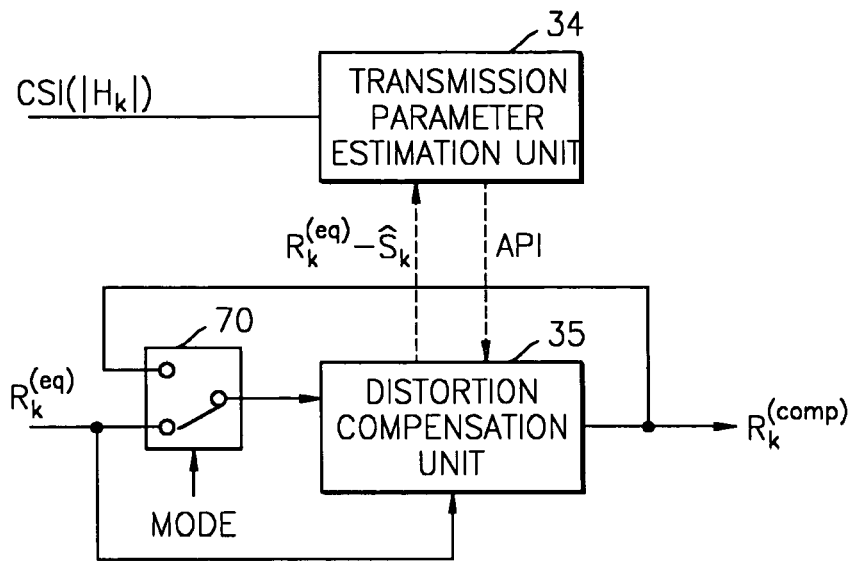
FIG. 6 is a detailed block diagram of an apparatus compensating for multicarrier signal distortion according to still another preferred embodiment of the present disclosure.

FIG. 6 is a detailed block diagram of an apparatus compensating for multicarrier signal distortion according to still another preferred embodiment of the present disclosure. Referring to FIG. 6, the apparatus compensating for multicarrier signal distortion further has mode selection unit 70 in the distortion compensation apparatus 32 of FIG. 3. Except the mode selection unit 70, the apparatus compensating for multicarrier signal distortion operates in the same manner as shown in FIGS. 3 through 5.

For example, in FIG. 3, when the FFT unit 29 performs FFT transform for the input bitstream (r) and outputs, the equalizer 30 performs first distortion compensation for the output signal of the FFT unit 29 and outputs the first compensation bitstream ($R_k^{(eq)}$) and channel state information (CSI). At this time, the mode selection unit 70 in response to a logic state of a mode signal (MODE), selects the first compensation bitstream ($R_k^{(eq)}$) or the output bitstream ($R_k^{(comp)}$) and outputs as the first bitstream (A). Then the apparatus compensating for multicarrier signal distortion of FIG. 6 processes the first bitstream (A) as in FIG. 3 and generates an estimation symbol stream ($\hat{S}_k$) and by using error information ($R_k^{(eq)}-\hat{S}_k$) and distortion information ($\hat{d}_k-P\hat{S}_k$), which are calculated by using the first bitstream (A) and the estimation symbol stream ($\hat{S}_k$), and the channel state information (CSI) in a least mean square algorithm, estimates amplifier parameter information (API). Then, by subtracting a compensation signal ($\hat{Q}_k$), which is calculated by using the distortion information ($\hat{d}_k-P\hat{S}_k$) and the amplifier parameter information (API), from the first bitstream (A), the apparatus outputs the subtraction result as an output bitstream ($R_k^{(comp)}$). Here, only when the mode selection unit outputs the first compensation bitstream ($R_k^{(eq)}$) as the first bitstream (A), the apparatus compensating for distortion 32 updates the amplifier parameter information (API) and the output bitstream ($R_k^{(comp)}$) is fed back to the mode selection unit and at least once or more is re-compensated in the apparatus compensating for distortion 32. In addition, the mode signal (MODE) is a signal to control the frequency of re-compensation. A first logic state (logic "low" state) of the mode signal (MODE) indicates that no re-compensation is performed, and a second logic state (logic "high" state) of the mode signal (MODE) indicates that re-compensation is performed.

Figure 7:
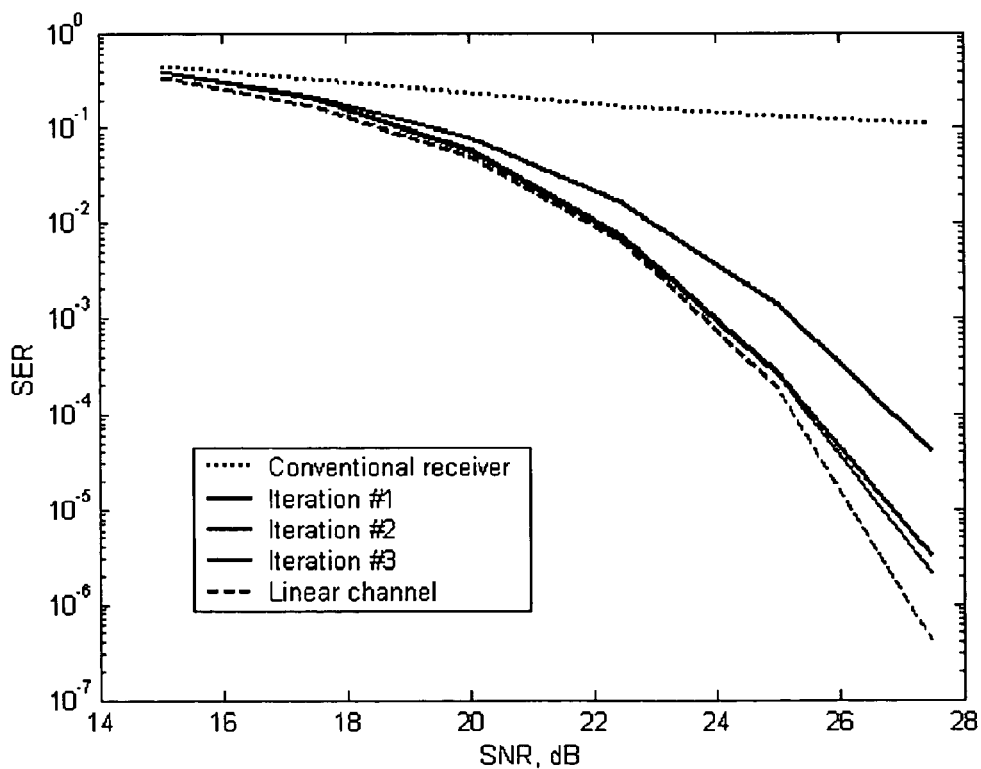
FIG. 7 is a graph showing the result of simulation when an apparatus compensating for multicarrier signal distortion according to the present disclosure was applied to multipath channels.
Figure 8:
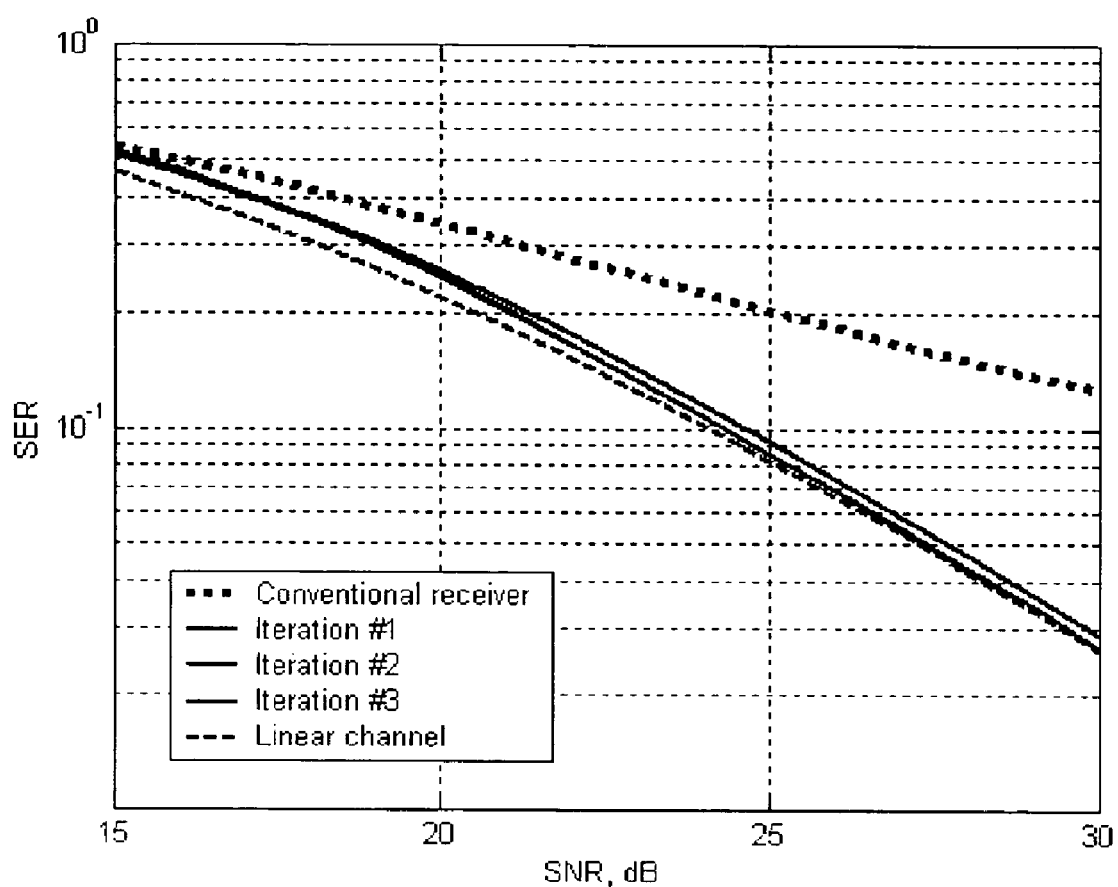
FIG. 8 is a graph showing the result of simulation when an apparatus compensating for multicarrier signal distortion according to the present disclosure was applied to multipath Rayleigh channels.

FIG. 7 is a graph showing the result of simulation when the apparatus 32 compensating for multicarrier signal distortion according to the present disclosure was applied to the multicarrier signal transmitted through additive white Gaussian noise (AWGN) channel. FIG. 8 is a graph showing the result of simulation when the apparatus 32 compensating for multicarrier signal distortion according to the present disclosure was applied to the multicarrier signal transmitted through multipath Rayleigh channel. These simulation results are about a 64-QAM OFDM system having 2048 subcarriers and 171 pilot subcarriers. As shown in FIGS. 7 and 8, when the distortion compensation apparatus of FIG. 6 was used, performance improvement is greater compared to the conventional receiver. Also, it is shown that whenever the output bitstream ($R_k^{(comp)}$) is fed back to the mode selection unit 70 and re-compensated in FIG. 6, much more performance improvement is achieved.

As described above, the multicarrier signal receiver according to a preferred embodiment of the present disclosure processes the first bitstream ($R_k^{(eq)}$) and generates an estimation symbol stream ($\hat{S}_k$). By using error information ($R_k^{(eq)}-\hat{S}_k$) and distortion information ($\hat{d}_k-P\hat{S}_k$), which are calculated by using the first bitstream ($R_k^{(eq)}$) and the estimation symbol stream ($\hat{S}_k$), and the CSI in a least mean square algorithm, the receiver estimates amplifier parameter information (API). Then, the receiver subtracts a compensation signal ($\hat{Q}_k$), which is calculated by using the distortion information ($\hat{d}_k - P\hat{S}_k$) and the amplifier parameter information (API), from the first bitstream ($R_k^{(eq)}$), and outputs the subtraction result as an output bitstream ($R_k^{(comp)}$). Accordingly, a demodulation signal with an improved SER can be obtained through a subsequent decoding processing end. In addition, the mode selection unit is provided and the output bitstream ($R_k^{(comp)}$) is re-compensated many times such that much more system performance improvement can be achieved.

As described above, with the apparatus for compensating multicarrier signals according to the present disclosure and the multicarrier signal receiver using the apparatus, even though an accurate transfer function of a high power amplifier (HPA) is not known and side information or a special training signal is not transmitted when a signal is transmitted, parameter information on the HPA mode is extracted from the received signal so that nonlinear distortion of the received multicarrier signal is compensated for. Accordingly, nonlinearly distorted multicarrier signals such as OFDM signals transmitted by an HPA having a variety of transfer function s can be adaptively compensated and therefore a demodulated signal with an improved symbol error rate (SER) can be obtained.

Preferred embodiments have been explained above and are shown. However, the present invention is not limited to the preferred embodiments described above, and it is apparent that variations and modifications by those skilled in the art can be effected within the spirit and scope of the present invention. Therefore, the embodiments should be understood not as limitations but as explanations. The scope of the present invention is not determined by the above description but by the accompanying claims, and variations and modifications may be made to the embodiments of the invention without departing from the scope of the invention as defined by the appended claims and legal equivalents.

What is claimed is:

1. An apparatus for compensating multicarrier signal distortion, comprising:
a transmission parameter estimation unit which by using error information, distortion information and channel state information in a predetermined algorithm, calculates and outputs amplifier parameter information; and
a distortion compensation unit which by processing a first bitstream, generates an estimation symbol stream, and by using the first bitstream and the estimation symbol stream, calculates and outputs the error information and the distortion information, and subtracts a compensation signal, which is calculated by using the distortion information and the amplifier parameter information, from the first bitstream, and outputs the subtraction result as an output bitstream,
wherein the distortion compensation unit comprises:
a demapping and pilot insertion unit which demaps the first bitstream, inserts a pilot, and outputs the estimation symbol stream;
a first subtraction unit which subtracts the estimation symbol stream from the first bitstream and outputs the error information;
a signal distortion calculating unit which by using the estimation symbol stream, calculates and outputs the distortion information;
a compensation signal outputting unit which by using the distortion information and the amplifier parameter information, calculates and outputs the compensation signal; and
a second subtraction unit, which subtracts the compensation signal from the first bitstream and outputs the output bitstream.

2. The apparatus as defined in claim 1, further comprising:
a mode selection unit, which in response to a logic state of a mode signal, selects an input bitstream or an output bitstream, and outputs as a first bitstream;
wherein the transmission parameter estimation unit calculate and outputs amplifier parameter information to the distortion compensation unit by using the error information, the distortion information and the channel state information in a predetermined algorithm only when the mode selection unit outputs the input bitstream as the first bitstream; and
wherein the distortion compensation unit which by processing the first bitstream, generates an estimation symbol stream, and by using the first bitstream and the estimation symbol stream, calculates and outputs the error information and the distortion information, and subtracts a compensation signal, which is calculated by using the distortion information and the amplifier parameter information, from the first bitstream, and outputs the subtraction result as an output bitstream, wherein the output bitstream is fed back to the mode selection unit such that the output bitstream is re-compensated in the distortion compensation unit at least once or more.

3. The apparatus of claim 1, the signal distortion calculating unit comprises a plurality of distortion signal generators, each of which generates one of a plurality of distortion signals forming the distortion information, and each of the distortion signal generators comprises:
a multiplier, which multiplies the estimation symbol stream by relating a predetermined constant and outputs the result;
a convolution calculation unit which calculates and outputs a predetermined convolution value for the estimation symbol stream; and
a subtracter, which subtracts the output signal of the multiplier from the predetermined convolution value and outputs a distortion signal.

4. The apparatus of claim 1, wherein the signal distortion calculating unit comprises a first distortion signal generator and a second distortion signal generator which output a first distortion signal and a second distortion signal, respectively, the signals forming the distortion information.

5. The apparatus of claim 4, wherein the first distortion signal generator comprises:
a first multiplier which multiplies a first predetermined constant by the estimation symbol stream and outputs the result;
a first zero addition unit, which adds first zeros to the estimation symbol stream and outputs the result;

a first fast Fourier transform (FFT) unit which performs first FFT transform for point values formed with the estimation symbol stream and the first zeros and outputs the result;
a first square calculation unit which calculates the square of the first FFT transformed value and outputs the result as a first square value;
a first sequence change unit which reverses the sequence of the point values of the estimation symbol stream and outputs the result;
a second FFT unit which performs second FFT transform for point values formed with the sequence-reversed estimation symbol stream and the first zeros and outputs the result;
a second multiplier which multiplies the first square value by the output value of the second FFT unit and outputs the result;
a first inverse fast Fourier transform (IFFT) unit which performs IFFT transform for the output value of the second multiplier and outputs a first convolution value;
a first out-of-band component removal unit which removes the out-of-band component from the first convolution value and outputs the result; and
a first subtraction unit which subtracts the output value of the first multiplier from the output value of the out-of-band component removal unit and outputs the result as the first distortion signal.

6. The apparatus of claim 5, wherein the second distortion signal generator comprises:
a third multiplier which multiplies the estimation symbol stream by a second predetermined constant and outputs the result;
a second zero addition unit, which adds second zeros to the estimation symbol stream and outputs the result;
a third FFT unit, which performs third FFT transform for point values formed with the estimation symbol stream and the second zeros;
a cube calculation unit, which calculates and outputs the cube of the third FFT transformed value;
a second sequence change unit, which reverse the sequence of the point values of the estimation symbol stream and outputs the result;
a fourth FFT unit which performs fourth FFT transform for point values formed with the sequence-reversed estimation symbol stream and the second zeros;
a second square unit which calculates the square value of the fourth FFT transformed value and outputs the result as a second square value;
a fourth multiplier which multiplies the output value of the cube calculation unit by the second square value and outputs the result;
a second IFFT unit which performs IFFT transforms for the output of the fourth multiplier and outputs a second convolution value;
a second out-of-band component removal unit which removes the out-of-band component from the second convolution value and outputs the result; and
a second subtraction unit which subtracts the output value of the third multiplier from the output value of the second out-of-band component removal unit and outputs the result as the second distortion signal.

7. The apparatus of claim 3, wherein if the plurality of distortion signal generators are formed with a first distortion signal generator and a second signal generator, the amplifier parameter information is calculated by the following equations:

$$E = [R_0^{(eq)} - \hat{S}_0 R_1^{(eq)} - \hat{S}_1 \ldots R_{N-1}^{(eq)} - \hat{S}_{N-1}]^T$$

$$D = \begin{bmatrix} \hat{d}_0^{(3)} - p^{(3)}\hat{S}_0 & \hat{d}_0^{(5)} - p^{(5)}\hat{S}_0 \\ \hat{d}_1^{(3)} - p^{(3)}\hat{S}_1 & \hat{d}_1^{(5)} - p^{(5)}\hat{S}_2 \\ \ldots & \ldots \\ \hat{d}_{N-1}^{(3)} - p^{(3)}\hat{S}_{N-1} & \hat{d}_{N-1}^{(5)} - p^{(5)}\hat{S}_{N-1} \end{bmatrix}$$

$$\hat{c} = (D^T D)^{-1} D^T E$$

where E denotes error information, D denotes distortion information, ĉ denotes amplifier parameter information, $R^{(eq)}$ denotes a first bitstream, Ŝ denotes an estimation symbol stream, $d^{(3)}$ denotes a convolution value used in first distortion signal calculation, $d^{(5)}$ denotes a convolution value used in second distortion signal calculation, $p^{(3)}$ denotes a predetermined constant used in the first distortion signal calculation, $p^{(5)}$ denotes a predetermined constant used in the second distortion signal calculation, and subscripts 0,1, . . . , N–1 correspond to subcarrier indexes,
and wherein when the channel state information of a certain subcarrier is less than a predetermined critical value, values corresponding to the subcarrier are excluded from the equations.

8. The apparatus of claim 7, wherein the convolution values of the first and second distortion signal generators are obtained by the following equations respectively:

$$\{\hat{d}_k^{(3)}\} = \{\hat{S}_k\}*\{\hat{S}_k\}*\{\hat{S}_{N-k}^+\} =$$

$$IFFT([FFT\{[\hat{S}_0 \ldots \hat{S}_{N-1} \ldots 0 \ldots 0]\}]^{\cap 2} \circ FFT \{[\hat{S}_{N-1} \ldots \hat{S}_0 \ldots 0 \ldots]\}), k=-N, \ldots, 2N-1$$

$$\{\hat{d}_k^{(5)}\} = \{\hat{S}_k\}*\{\hat{S}_k\}*\{\hat{S}_k\}*\{\hat{S}_{N-k}^+\}*\{\hat{S}_{N-k}^+\} =$$

$$IFFT([FFT\{[\hat{S}_0 \ldots \hat{S}_{N-1} \ldots 0 \ldots 0]\}]^{\cap 3} \circ [FFT \{[\hat{S}_{N-1} \ldots \hat{S}_0 \ldots 0 \ldots]\}]^{\cap 2}), k=-2N, \ldots 3N-1$$

where $d^{(3)}$ denotes a convolution value used in first distortion signal calculation, $d^{(5)}$ denotes a convolution value used in second distortion signal calculation, and Ŝ denotes an estimation symbol stream.

9. A multicarrier signal receiver comprising:
an FFT unit which performs FFT transforms for an input bitstream and outputs the result;
an equalizer which performs first distortion compensation for the output signal of the FFT unit and outputs a first bitstream and channel state information; and
a distortion compensation unit which by processing the first bitstream, generates an estimation symbol stream, and by using error information and distortion information, which are calculated by using the first bitstream and the estimation symbol stream, and the channel state information in a predetermined algorithm, estimates amplifier parameter information, and subtracts a compensation signal, which is calculated by using the distortion information and the amplifier parameter information, from the first bitstream, and outputs the subtraction result as an output bitstream,
wherein calculating the output bitstream comprises:
demapping the first bitstream, inserting a pilot, and outputting the estimation symbol stream;
subtracting the estimation symbol stream from the first bitstream and outputting the error information;

by using the estimation symbol stream, calculating and outputting the distortion information;

by using the distortion information and the amplifier parameter information, calculating and outputting the compensation signal; and subtracting the compensation signal from the first bitstream and outputting the output bitstream.

10. A multicarrier signal receiver comprising:

an FFT unit which performs FFT transforms for an input bitstream and outputs the result;

an equalizer which performs a first distortion compensation for the output signal of the FFT unit and outputs a first compensation bitstream and channel state information;

a mode selection unit which in response to a logic state of a mode signal, selects the first compensation bitstream or the output bitstream and outputs as a first bitstream; and a distortion compensation unit which by processing the first bitstream, generates an estimation symbol stream, and by using error information and distortion information, which are calculated by using the first bitstream and the estimation symbol stream, and the channel state information in a predetermined algorithm, estimates amplifier parameter information, and subtracts a compensation signal, which is calculated by using the distortion information and the amplifier parameter information, from the first bitstream, and outputs the subtraction result as an output bitstream, wherein only when the mode selection unit outputs the first compensation bitstream as the first bitstream, the distortion compensation apparatus updates the amplifier parameter information and the output bitstream is fed back to the mode selection unit so that the output bitstream is re-compensated in the distortion compensation apparatus at least once, wherein calculating the output bitstream comprises:

demapping the first bitstream, inserting a pilot, and outputting the estimation symbol stream;

subtracting the estimation symbol stream from the first bitstream and outputting the error information;

by using the estimation symbol stream, calculating and outputting the distortion information;

by using the distortion information and the amplifier parameter information, calculating and outputting the compensation signal; and subtracting the compensation signal from the first bitstream and outputting the output bitstream.

11. A method for compensating multicarrier signal distortion comprising:

in response to a logic state of a mode signal, selecting an input bitstream or an output bitstream, and outputting as a first bitstream;

by processing the first bitstream, generating an estimation symbol stream;

by using the first bitstream and the estimation symbol stream, calculating and outputting error information and distortion information;

by using the error information, the distortion information and channel state information in a predetermined algorithm only when the input bitstream is output as the first bitstream, calculating and outputting amplifier parameter information; and subtracting a compensation signal, which is calculated by using the distortion information and the amplifier parameter information, from the first bitstream, and outputting the subtraction result as an output bitstream, wherein the output bitstream is fed back as the first bitstream such that the output bitstream is re-compensated in the distortion compensation unit at least once, wherein calculating the output bitstream comprises:

demapping the first bitstream, inserting a pilot, and outputting the estimation symbol stream;

subtracting the estimation symbol stream from the first bitstream and outputting the error information;

by using the estimation symbol stream, calculating and outputting the distortion information;

by using the distortion information and the amplifier parameter information, calculating and outputting the compensation signal; and subtracting the compensation signal from the first bitstream and outputting the output bitstream.

12. The method of claim 11, wherein the distortion information s output from a distortion compensation unit and comprises a plurality of distortion signals and calculating each of the distortion signals comprises:

multiplying the estimation symbol stream by relating a predetermined constant and outputting the result;

calculating and outputting a predetermined convolution value for the estimation symbol stream; and subtracting the output signal of the multiplier from the predetermined convolution value and outputting a distortion signal.

13. The method of claim 11, wherein the distortion information output from a distortion compensation unit is formed with a first distortion signal and a second distortion signal.

14. The method of claim 13, wherein calculating the first distortion signal output from a distortion compensation unit comprises:

multiplying a first predetermined constant by the estimation symbol stream and outputting the result;

adding first zeros to the estimation symbol stream and outputting the result;

performing first FFT transform for point values formed with the estimation symbol stream and the first zeros and outputting the result;

calculating the square of the first FFT transformed value and outputting the result as a first square value;

reversing the sequence of the point values of the estimation symbol stream and outputting the result;

performing second FFT transform for point values formed with the sequence-reversed estimation symbol stream and the first zeros and outputting the result;

second multiplying the first square value by the second FFT transformed result and outputting the result;

performing IFFT transform for the second multiplication result and outputting a first convolution value;

removing the out-of-band component from the first convolution value and outputting the result; and subtracting the first multiplication result from the result of the removal of the out-of-band component, and outputting the result as the first distortion signal.

15. The method of claim 13, wherein calculating the second distortion signal output from a distortion compensation unit comprises:

multiplying the estimation symbol stream by a second predetermined constant and outputting the result;

adding second zeros to the estimation symbol stream and outputting the result;

performing third FFT transform for point values formed with the estimation symbol stream and the second zeros;

calculating and outputting the cube of the third FFT transformed value;

reversing the sequence of the point values of the estimation symbol stream and outputting the result;

performing fourth FFT transform for point values formed with the sequence-reversed estimation symbol stream and the second zeros;

calculating the square value of the fourth FFT transformed value and outputting the result as a second square value;

fourth multiplying the cube value by the second square value and outputting the result;

performing IFFT transform for the fourth multiplication result and outputting a second convolution value;

removing the out-of-band component from the second convolution value and outputting the result; and subtracting the third multiplication result from the result of the removal of the out-of-band component in the second convolution value, and outputting the result as the second distortion signal.

16. The method of claim 12, wherein if the distortion information comprises a first distortion signal and a second distortion signal, the amplifier parameter information is calculated by the following equations:

$$E = \left[ R_0^{(eq)} - \hat{S}_0 \; R_1^{(eq)} - \hat{S}_1 \; \ldots \; R_{N-1}^{(eq)} - \hat{S}_{N-1} \right]^T$$

$$D = \begin{bmatrix} \hat{d}_0^{(3)} - p^{(3)}\hat{S}_0 & \hat{d}_0^{(5)} - p^{(5)}\hat{S}_0 \\ \hat{d}_1^{(3)} - p^{(3)}\hat{S}_1 & \hat{d}_1^{(5)} - p^{(5)}\hat{S}_2 \\ \ldots & \ldots \\ \hat{d}_{N-1}^{(3)} - p^{(3)}\hat{S}_{N-1} & \hat{d}_{N-1}^{(5)} - p^{(5)}\hat{S}_{N-1} \end{bmatrix}$$

$$\hat{c} = (D^T D)^{-1} D^T E$$

where E denotes error information, D denotes distortion information, ĉ denotes amplifier parameter information, $R^{(eq)}$ denotes a first bitstream, Ŝ denotes an estimation symbol stream, $d^{(3)}$ denotes a convolution value used in first distortion signal calculation, $d^{(5)}$ denotes a convolution value used in second distortion signal calculation, $p^{(3)}$ denotes a predetermined constant used in the first distortion signal calculation, $p^{(5)}$ denotes a predetermined constant used in the second distortion signal calculation, and subscripts 0,1, . . . , N–1 correspond to subcarrier indexes, wherein when the channel state information of a certain subcarrier is less than a predetermined critical value, values corresponding to the subcarrier are excluded from the equations.

17. The method of claim 16, wherein the convolution values used in calculation of the first and second distortion signals output from a distortion compensation unit are obtained by the following equations respectively:

$$\{\hat{d}_k^{(3)}\} = \{\hat{S}_k\} * \{\hat{S}_k\} * \{\hat{S}_{N-k}^+\} =$$

$$IFFT([FFT\{[\hat{S}_0 \ldots \hat{S}_{N-1} \ldots 0 \ldots 0]\}]^{\cap 2} \circ FFT \\ \{[\hat{S}_{N-1} \ldots \hat{S}_0 \ldots 0 \ldots 0]\}), k = -N, \ldots, 2N-1$$

$$\{\hat{d}_k^{(5)}\} = \{\hat{S}_k\} * \{\hat{S}_k\} * \{\hat{S}_k\} * \{\hat{S}_{N-k}^+\} * \{\hat{S}_{N-k}^+\} =$$

$$IFFT([FFT\{[\hat{S}_0 \ldots \hat{S}_{N-1} \ldots 0 \ldots 0]\}]^{\cap 3} \circ [FFT \\ \{[\hat{S}_{N-1} \ldots \hat{S}_0 \ldots 0 \ldots 0]\}]^{\cap 2}), k = -2N, \ldots 3N-1$$

where $d^{(3)}$ denotes a convolution value used in first distortion signal calculation, $d^{(5)}$ denotes a convolution value used in second distortion signal calculation, and Ŝ denotes an estimation symbol stream.

18. A multicarrier signal demodulation method comprising:

performing an FFT transform for an input bitstream and outputting the result;

performing a first distortion compensation for the FFT transformed result and outputting a first bitstream and channel state information;

by processing the first bitstream, generating an estimation symbol stream;

by using the first bitstream and the estimation symbol stream, calculating and outputting error information and distortion information;

by using the error information, the distortion information and the channel state information in a predetermined algorithm, calculating and outputting amplifier parameter information; and subtracting a compensation signal, which is calculated by using the distortion information and the amplifier parameter information, from the first bitstream, and outputting the subtraction result as an output bitstream, wherein calculating the output bitstream comprises:

demapping the first bitstream, inserting a pilot, and outputting the estimation symbol stream;

subtracting the estimation symbol stream from the first bitstream and outputting the error information;

by using the estimation symbol stream, calculating and outputting the distortion information;

by using the distortion information and the amplifier parameter information, calculating and outputting the compensation signal; and subtracting the compensation signal from the first bitstream and outputting the output bitstream.

19. A multicarrier signal demodulation method comprising:

performing FFT transforms for an input bitstream and outputting the result;

performing a first distortion compensation for the FFT transformed result and outputting a first compensation bitstream and channel state information;

in response to a logic state of a mode signal, selecting the first compensation bitstream or the output bitstream and outputting as a first bitstream;

by processing the first bitstream, generating an estimation symbol stream;

by using the first bitstream and the estimation symbol stream, calculating and outputting error information and distortion information;

by using the error information, the distortion information and the channel state information in a predetermined algorithm, calculating and outputting amplifier parameter information; and subtracting a compensation signal, which is calculated by using the distortion information and the amplifier parameter information, from the first bitstream, and outputting the subtraction result as an output bitstream, wherein only when the first compensation bitstream is output as the first bitstream, the amplifier parameter information is updated and the output bitstream is fed back as the first bitstream so that the output bitstream is re-compensated at least once, and wherein calculating the output bitstream comprises:

demapping the first bitstream, inserting a pilot, and outputting the estimation symbol stream;

subtracting the estimation symbol stream from the first bitstream and outputting the error information;

by using the estimation symbol stream, calculating and outputting the distortion information;

by using the distortion information and the amplifier parameter information, calculating and outputting the compensation signal; and subtracting the compensation signal from the first bitstream and outputting the output bitstream.

20. A method for compensating multicarrier signal distortion comprising:
by processing a first bitstream, generating an estimation symbol stream;
by using the first bitstream and the estimation symbol stream, calculating and outputting error information and distortion information;
by using the error information, the distortion information and channel state information in a predetermined algorithm, calculating and outputting amplifier parameter information; and
subtracting a compensation signal, which is calculated by using the distortion information and the amplifier parameter information, from the first bitstream, and outputting the subtraction result as an output bitstream,
wherein calculating the output bitstream comprises:
demapping the first bitstream, inserting a pilot, and outputting the estimation symbol stream;
subtracting the estimation symbol stream from the first bitstream and outputting the error information;
by using the estimation symbol stream, calculating and outputting the distortion information;
by using the distortion information and the amplifier parameter information, calculating and outputting the compensation signal; and
subtracting the compensation signal from the first bitstream and outputting the output bitstream.

21. The method as defined in claim 16, further comprising the first distortion signal of the distortion information by
multiplying a first predetermined constant by the estimation symbol stream and outputting the result;
adding first zeros to the estimation symbol stream and outputting the result;
performing first FFT transform for point values formed with the estimation symbol stream and the first zeros and outputting the result;
calculating the square of the first FFT transformed value and outputting the result as a first square value;
reversing the sequence of the point values of the estimation symbol stream and outputting the result;
performing second FFT transform for point values formed with the sequence-reversed estimation symbol stream and the first zeros and outputting the result;
second multiplying the first square value by the second FFT transformed result and outputting the result;
performing IFFT transform for the second multiplication result and outputting a first convolution value;
removing the out-of-band component from the first convolution value and outputting the result; and
subtracting the first multiplication result from the result of the removal of the out-of-band component, and outputting the result as the first distortion signal.

22. The apparatus as defined in claim 7, further comprising:
a mode selection unit, which in response to a logic state of a mode signal, selects an input bitstream or an output bitstream, and outputs as a first bitstream;
wherein the transmission parameter estimation unit which by using error information, distortion information and channel state information in a predetermined algorithm only when the mode selection unit outputs the input bitstream as the first bitstream, and calculates and outputs amplifier parameter information; and wherein the distortion compensation unit which by processing the first bitstream, generates an estimation symbol stream, and by using the first bitstream and the estimation symbol stream, calculates and outputs the error information and the distortion information, and subtracts a compensation signal, which is calculated by using the distortion information and the amplifier parameter information, from the first bitstream, and outputs the subtraction result as an output bitstream,
wherein the output bitstream is fed back to the mode selection unit such that the output bitstream is re-compensated in the distortion compensation unit at least once or more.

23. The apparatus as defined in claim 7, further comprising a multicarrier signal receiver, the multicarrier signal receiver comprising:
an FFT unit which performs FFT transforms for an input bitstream and outputs the result;
an equalizer which performs first distortion compensation for the output signal of the FFT unit and outputs a first bitstream and channel state information; and
a distortion compensation unit which by processing the first bitstream, generates an estimation symbol stream, and by using error information and distortion information, which are calculated by using the first bitstream and the estimation symbol stream, and the channel state information in a predetermined algorithm, estimates amplifier parameter information, and subtracts a compensation signal, which is calculated by using the distortion information and the amplifier parameter information, from the first bitstream, and outputs the subtraction result as an output bitstream,
wherein calculating the output bitstream comprises:
demapping the first bitstream, inserting a pilot, and outputting the estimation symbol stream;
subtracting the estimation symbol stream from the first bitstream and outputting the error information;
by using the estimation symbol stream, calculating and outputting the distortion information;
by using the distortion information and the amplifier parameter information, calculating and outputting the compensation signal; and
subtracting the compensation signal from the first bitstream and outputting the output bitstream.

24. An apparatus as defined in claim 7, further comprising a multicarrier signal receiver, the multicarrier signal receiver comprising:
an FFT unit which performs FFT transforms for an input bitstream and outputs the result;
an equalizer which performs a first distortion compensation for the output signal of the FFT unit and outputs a first compensation bitstream and channel state information;
a mode selection unit which in response to a logic state of a mode signal, selects the first compensation bitstream or the output bitstream and outputs as a first bitstream; and
a distortion compensation unit which by processing the first bitstream, generates an estimation symbol stream, and by using error information and distortion information, which are calculated by using the first bitstream and the estimation symbol stream, and the channel state information in a predetermined algorithm, estimates amplifier parameter information, and subtracts a compensation signal, which is calculated by using the distortion information and the amplifier parameter information, from the first bitstream, and outputs the subtraction result as an output bitstream, wherein only when the mode selection unit outputs the first compensation bitstream as the first bitstream, the distortion compensation apparatus updates the amplifier parameter information and the output bitstream is fed back to the mode selection unit so that the output bitstream is re-compensated in the distortion compensation apparatus at least once, wherein calculating the output bitstream comprises:

demapping the first bitstream, inserting a pilot, and outputting the estimation symbol stream;

subtracting the estimation symbol stream from the first bitstream and outputting the error information;

by using the estimation symbol stream, calculating and outputting the distortion information;

by using the distortion information and the amplifier parameter information, calculating and outputting the compensation signal; and subtracting the compensation signal from the first bitstream and outputting the output bitstream.

* * * * *